US010116378B1

(12) United States Patent
Morowsky et al.

(10) Patent No.: US 10,116,378 B1
(45) Date of Patent: Oct. 30, 2018

(54) SYSTEMS AND METHOD OF AUTOMATICALLY GENERATED RADIO CALLS

(71) Applicant: HONEYWELL INTERNATIONAL INC., Morris Plains, NJ (US)

(72) Inventors: Katarina Alexis Morowsky, Corvallis, OR (US); Aaron Gannon, Anthem, AZ (US); Ivan Sandy Wyatt, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/709,916

(22) Filed: Sep. 20, 2017

(51) Int. Cl.
G08B 21/00 (2006.01)
H04B 7/185 (2006.01)
G08G 5/02 (2006.01)
G08G 5/00 (2006.01)
G08G 5/04 (2006.01)
G05D 1/00 (2006.01)

(52) U.S. Cl.
CPC ....... H04B 7/18508 (2013.01); G08G 5/0021 (2013.01); G08G 5/0056 (2013.01); G08G 5/025 (2013.01); G05D 1/0061 (2013.01); G08G 5/045 (2013.01)

(58) Field of Classification Search
CPC .............................. G08B 19/00; G08B 27/00
USPC ................ 340/945, 963, 970, 977; 701/4, 9
See application file for complete search history.

(56) References Cited

U.S. PATENT DOCUMENTS

| 5,714,948 A * | 2/1998 | Farmakis ............ B60R 25/1025 340/961 |
| 6,020,832 A * | 2/2000 | Jensen .................... G01C 5/005 340/970 |
| 6,385,513 B1 | 5/2002 | Murray et al. |
| 8,428,793 B2 | 4/2013 | Mettes |
| 2011/0125348 A1 | 5/2011 | Sandell et al. |

OTHER PUBLICATIONS

ATC Data Link News, last modified Nov. 16, 2016, obtained from: http://www.http://members.optusnet.com.au/~cjr/CPDL.htm, printed on Jul. 25, 2017.

* cited by examiner

*Primary Examiner* — Tai T Nguyen
(74) *Attorney, Agent, or Firm* — Lorenz & Kopf, LLP (57) ABSTRACT

A method in an aircraft computing system for facilitating communication between a flight crew and external communication facility (ECF) such as air traffic control (ATC) or airline operational control (AOC) is provided. The method comprises monitoring aircraft data by an aircraft computing system for a plurality of pre-defined, non-emergency conditions, detecting, by the aircraft computing system, a pre-defined, non-emergency condition requiring communication from the flight crew to the ECF, automatically generating and displaying a computer-generated message on an aircraft cockpit display responsive to detecting the condition requiring communication from the flight crew to the ECF, providing a selection option for transmitting the message to the ECF, and transmitting the message to the ECF in accordance with the option selected.

20 Claims, 7 Drawing Sheets

FIG. 7

SYSTEMS AND METHOD OF AUTOMATICALLY GENERATED RADIO CALLS

TECHNICAL FIELD

The present invention generally relates to call management during an aircraft flight, and more particularly relates to automatically generating radio calls during an aircraft flight.

BACKGROUND

In aviation, the occurrence of certain conditions may require flight crew on an aircraft to make a radio call to an external communication facility (ECF) such as air traffic control (ATC) or airline operational control (AOC). Some of the conditions may occur during high workload or high task saturation times, which may result in the flight crew forgetting to make reports or calls, or errors or imprecision occurring within calls that are made. The radio calls to ATC can follow a highly-formatted structure that requires the inclusion of specific pieces of information, such as ATC's name (e.g., New York Center), which the flight crew may not remember at the time the radio call needs to be made.

Hence, it is desirable to provide systems and methods for assisting the flight crew in making radio calls. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

An automatic message generation system for an aircraft is disclosed. The system includes a data mining engine including one or more processors configured by programming instructions encoded on non-transient computer readable media wherein the data mining engine is configured to mine aircraft data for indicators for a plurality of pre-defined, non-emergency conditions, a condition detection engine including one or more processors configured by programming instructions encoded on non-transient computer readable media wherein the condition detection engine is configured to detect from the mined aircraft data a pre-defined, non-emergency condition requiring communication from the flight crew to an external communication facility (ECF) such as air traffic control (ATC) or airline operational control (AOC), and a message generation engine including one or more processors configured by programming instructions encoded on non-transient computer readable media. The message generation engine is configured to automatically generate and display a computer-generated message on an aircraft cockpit display responsive to detecting the condition requiring communication from the flight crew to the ECF, provide a selection option for transmitting the message to the ECF and receive a selected option. The system further includes a message transmitter including one or more processors configured by programming instructions encoded on non-transient computer readable media wherein the message transmitter is configured to transmit the message to the ECF in accordance with the option selected.

A method in an aircraft computing system for facilitating communication between a flight crew and an external communication facility (ECF) such as air traffic control (ATC) or airline operational control (AOC) is disclosed. The method includes mining aircraft data, by an aircraft computing system, for indicators for a plurality of pre-defined, non-emergency conditions, detecting from the mined aircraft data, by the aircraft computing system, a pre-defined, non-emergency condition requiring communication from the flight crew to the ECF, automatically generating and displaying a computer-generated message on an aircraft cockpit display responsive to detecting the condition requiring communication from the flight crew to the ECF, providing a selection option for transmitting the message to the ECF, and transmitting the message to the ECF in accordance with the option selected.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, touchscreens, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The occurrence of certain conditions may require a flight crew on an aircraft to report (e.g., via a radio call or a data link message) the condition to an external communication facility (ECF) such as air traffic control (ATC) or airline operational control (AOC). Some of the conditions requiring the flight crew to make the report occur during high workload or high task saturation times. Examples may include instances when an aircraft enters a holding pattern, exits a holding pattern, performs a missed approach/go-around maneuver, leaves an altitude for the top of descent, checks-in to a new frequency, and others.

The report to the ECF in some instances follows a highly-formatted structure with the required inclusion of certain specific pieces of information. In other instances, environment-specific information may need to be included in the report. As an example, when the flight crew reports the occurrence of "wind shear," the report (e.g., radio call or datalink message) may include the strength and wind fluctuations in velocity and direction.

As another example, when checking in with a new ATC center, the report to ATC should include the aircraft altitude. The subject matter described herein discloses apparatus, systems, techniques and articles for reading the aircraft's current altitude and including the altitude in the report to the ATC, e.g., "Fort Worth Center, Pilatus 389H, Flight Level Two Eight Zero."

In another example, the flight crew may be cleared to descend at the pilot's discretion, or alternatively, to "cross" a waypoint at a particular altitude. In either of these cases, the flight crew makes the decision as to when to leave the previously assigned altitude for the newly assigned altitude, but must report leaving the previously assigned altitude. The subject matter described herein discloses apparatus, systems, techniques and articles that may sense the aircraft leaving an altitude, compare this with the most recent clearance (e.g., to confirm that the aircraft is permitted to leave the altitude), and then generate a report such as "Leaving Flight Level Two Eight Zero Descending Flight Level Two Two Zero" message. Moreover, the subject matter described herein discloses apparatus, systems, techniques and articles that could use the newly set ASEL (Altitude Select) value (e.g., 22,000) in the construction of the report, and even error check this value with the known clearance. The subject matter described herein discloses apparatus, systems, techniques and articles that may also cross-compare modes, such as VNAV (vertical navigation). For instance, if the ASEL is set to the bottom altitude of a SID (standard instrument departure), and VNAV is programmed to honor all altitudes on that SID, the subject matter described herein discloses apparatus, systems, techniques and articles that could construct a message such as "descending via HAWKZ5 arrival."

In yet another example, when on the FAF (final approach fix), the ATC Approach Facility may instruct the flight crew to contact the ATC Tower Facility, which may interrupt the task flow that normally occurs around the FAF (e.g., final configuration for gear and flaps). The subject matter described herein discloses apparatus, systems, techniques and articles that may be set to auto-intercept this type of "contact" message (which often happens at the same place, and often interrupts the same activities), auto-respond, and report back how it responded.

For example, the ATC may at 5 miles out request the flight crew to "report 3 miles." The subject matter described herein discloses apparatus, systems, techniques and articles that may be set to monitor the distance and generate a reporting message that may be sent at the right distance. In this example of an easily forgotten call, the system may listen for a range and provide a message for sending (e.g., 10 seconds before the 3 mile point) that serves both as a reminder and a workload reducer.

Conditions can be monitored that can indicate the need for a reporting message (e.g., radio call or data link message) being sent to the ECF. The subject matter described herein discloses apparatus, systems, techniques and articles for monitoring aircraft data for the occurrence of conditions signaling the need for a reporting message to the ECF and automatically generating a reporting message. The disclosed apparatus, systems, techniques and article may assist flight crew in sending a reporting message to the ECF during high workload situations and may provide the flight crew with data for the reporting message that may not always be visually depicted (e.g., the name of the ECF being called).

Figure 1:
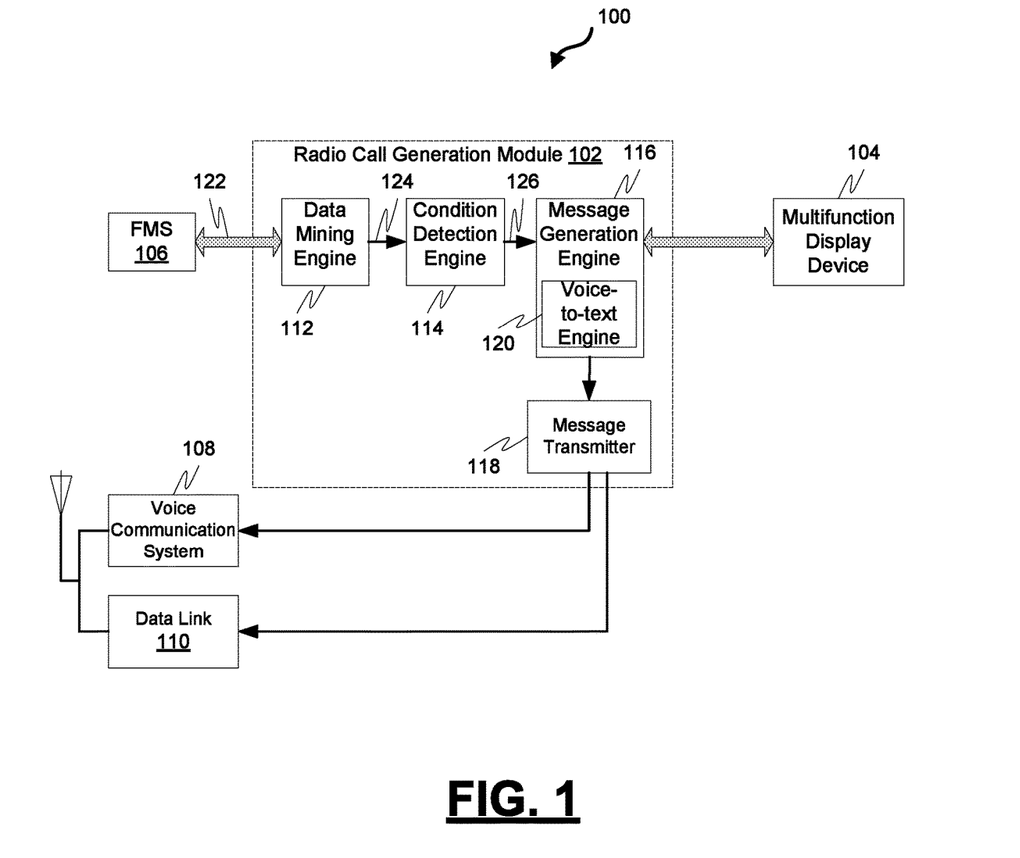
FIG. 1 is a block diagram depicting example aircraft equipment for an example automatic message generation system in an aircraft, in accordance with some embodiments

FIG. 1 is a block diagram depicting example aircraft equipment 100 for an example automatic message generation system in an aircraft. The example equipment 100 includes a radio call generation module 102, an aircraft cockpit display device 104, such as a multi-function control and display unit (MCDU) or a touchscreen control system (TSC), flight deck equipment such as a flight management system (FMS) 106, a voice communication system 108 for communicating via voice with an external communication facility (ECF) such as air traffic control (ATC) or airline operational control (AOC), and a data link 110, such as a digital controller-pilot data link communications (CPDLC) system, for communicating via text with the ECF.

The example radio call generation module 102 is configured to monitor aircraft data for a plurality of pre-defined, emergency and non-emergency conditions, detect pre-defined, emergency and non-emergency conditions requiring communication from the flight crew to the ECF, automatically generate and display a computer-generated message on an aircraft cockpit display responsive to detecting an emergency or non-emergency condition, provide a selection option for transmitting the message to the ECF, receive a selected option, and transmit the message to the ECF in accordance with the selected option. The example radio call generation module 102 includes a data mining engine 112, a condition detection engine 114, a message generation engine 116, and a message transmitter 118. The message generation engine 116 includes a voice-to-text-engine 120.

The example radio call generation module 102 includes a controller that is configured to implement the data mining engine 112, condition detection engine 114, message generation engine 116, message transmitter 118 and voice-to-text-engine 120. The controller includes at least one processor and a computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example data mining engine 112 is configured to retrieve aircraft data that can be mined for indicators for a plurality of pre-defined, emergency and non-emergency conditions. The example data mining engine 112 is configured to retrieve aircraft data from a standard or non-standard aircraft interface 122 such as an ARINC 429 interface, an ARINC 661 interface, a wireless data transfer system interface, a proprietary aircraft data transfer system interface or some other standard or non-standard aircraft data transfer system interface. The example data mining engine 112 is configured to retrieve aircraft data from flight deck equipment such as the FMS 106. The aircraft data may include one or more of flight plan data, fuel and weights data, ATC log data, aircraft state data, and aircraft sensors data. The example data mining engine 112 is configured to supply mined aircraft data 124 to the example condition detection engine 114.

The example condition detection engine 114 is configured to both determine one or more pre-defined, non-emergency conditions requiring communication from the flight crew to the ECF for which to monitor, and to detect from the mined data 124 a pre-defined, emergency or non-emergency condition requiring communication from the flight crew to the ECF. The pre-defined, non-emergency conditions consists of normal and abnormal conditions that may include a plurality of routine conditions requiring communication from a flight crew to the ECF, a plurality of regulatory conditions requiring communication from the flight crew to the ECF, and a plurality of pre-defined, non-emergency, abnormal conditions requiring communication from the flight crew to the ECF.

A routine condition may result from normal flight operations such as turbulence or other naturally occurring flight conditions. For instance, the aircraft accelerometers could be used as a state sensor, and automatically characterize turbulence as smooth (none), light, moderate, severe, or extreme, as well as chop (or not chop) for light and moderate levels, intermittent, occasional, and continuous. A reporting message may be needed to report entry and departure from such conditions. Other examples that may be sensed by aircraft systems include icing or windshear.

A regulatory condition is specified in a regulation such as 14 CFR 121.565, wherein engine shutdown must be reported and flight state updated with the appropriate communication facility such as air traffic control (ATC) or airline operational control (AOC). Other reports such as those specified in Aeronautical Information Manual 5-3-2 (having to do with position reporting) or 7-6-3 (having to do with near midair collision) may also need to be reported. In the case of near midair collision (e.g., less than 500 feet to intruder aircraft), a report may need to be generated that includes the time, location, altitude, ID of both aircraft, flight plan, present altimeter, weather conditions, and aircraft courses as logged by the system.

A non-emergency, abnormal condition results from a non-emergency loss of function by aircraft equipment such as the loss of an instrument landing system (ILS) receiver during flight under instrument flight rules. A malfunction report (as specified in 14 CFR 91.187) may need to be generated that includes the aircraft identification, equipment affected, capability degradation, and nature and extent of assistance desired by the ATC.

The example condition detection engine 114 may determine one or more pre-defined, non-emergency conditions requiring communication from the flight crew to the ECF for which to monitor based on current aircraft data. As an example, if the flight crew has identified that the aircraft will enter a holding pattern at a specified waypoint through the FMS, the example condition detection engine 114 will determine from the FMS data that it will need to monitor for when the aircraft enters the holding pattern so that a message can be sent to the ECF notifying the ECF that the aircraft has entered the holding pattern. The example condition detection engine 114 may also be pre-programmed to monitor for one or more specific, pre-defined, non-emergency conditions requiring communication from the flight crew to the ECF. After detecting a pre-defined, non-emergency condition, the example condition detection engine 114 is configured to provide a notification 126 to the example message generation engine 116 of the detected condition.

The example message generation engine 116 is configured to automatically generate and display a computer-generated message on an aircraft cockpit display 104 responsive to the notification 126 that a condition requiring communication from the flight crew to the ECF has been detected, provide a selection option for transmitting the message to the ECF, and receive a selected option. The example message generation engine 116 is configured to automatically generate the computer-generated message as a computer-generated text message and/or a computer-generated voice message using the voice-to-text-engine 120, which is configured to translate the message into the voice message. The example message generation engine 116 is configured to generate a message according to a pre-determined format.

After generating a message, the example message generation engine 116 provides the message for display on the cockpit display 104 with a number of selection options. The selection options provided by the example message generation engine 116 may include the option to transmit no message, the option to transmit either a computer-generated voice message or a computer-generated textual message, or the option to transmit both a computer-generated voice message and a computer-generated textual message. The selection options may also include the option to modify or append information to the message. The flight crew, upon viewing the message, may choose one of the selection options, for example, using a multifunction display device or touchscreen controller 104. When a message type is selected for transmission to the ECF, the example message generation engine 116 is configured to pass the selected message type (e.g., voice, text, or both) to the message transmitter 118.

The example message transmitter 118 is configured to transmit the message to the ECF, in accordance with the option selected. The example message transmitter 118 is configured to transmit a text message using the data link 110 and is configured to transmit a voice message using the voice communication system 108.

The example radio call generation module 102 may also be configured to detect an emergency condition, automatically generate an emergency message in response to the emergency condition, and automatically transmit the emergency message to the ECF without the need for flight crew input. In one embodiment, an example condition detection engine 114 may be configured to detect an emergency condition. An example message generation engine 116 may be configured to automatically generate an emergency message in response to the emergency condition. An example message transmitter 118 may be configured to transmit the emergency message to the ECF as a text message using the data link 110 and/or as a voice message using the voice communication system 108.

Figure 2:
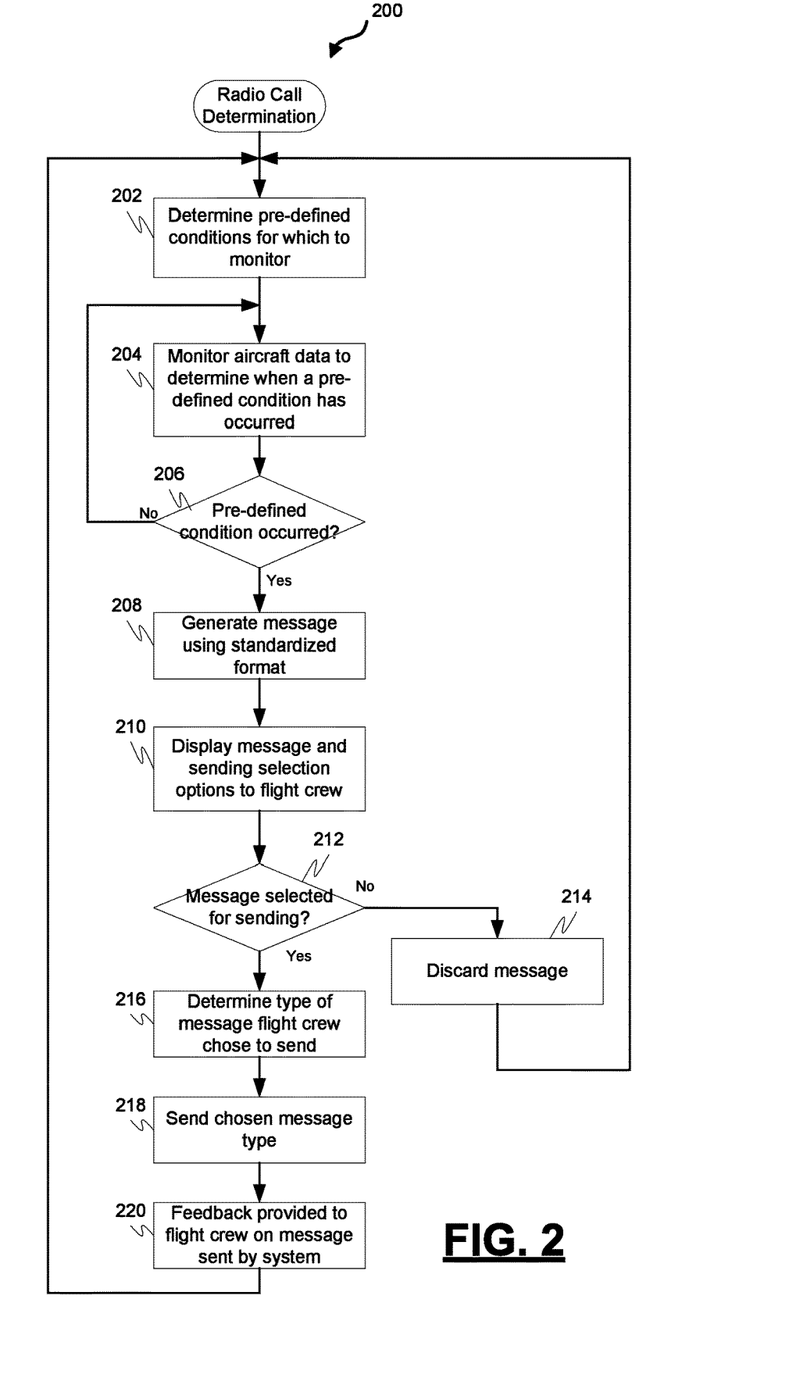
FIG. 2 is a process flow chart depicting an example process in aircraft equipment for automatically generating radio call messages for a flight crew to ATC for non-emergency conditions, in accordance with some embodiments.

FIG. 2 is a process flow chart depicting an example process 200 in aircraft equipment for automatically generating radio call messages for a flight crew to ECF for non-emergency conditions. The order of operation within the process is not limited to the sequential execution as illustrated in the figure, but may be performed in one or more varying orders as applicable and in accordance with the present disclosure. In various embodiments, the process can be scheduled to run based on one or more predetermined events, and/or can run continuously during operation of the aircraft.

The example process 200 includes determining pre-defined conditions for which to monitor (operation 202). The pre-defined conditions may be pre-programmed conditions and/or conditions determined to be monitored for based on current aircraft data.

The pre-defined, non-emergency conditions may include a plurality of routine conditions requiring communication from a flight crew to the ECF, a plurality of regulatory conditions requiring communication from the flight crew to the ECF, and/or a plurality of pre-defined, non-emergency, abnormal conditions requiring communication from the flight crew to the ECF. A routine condition may result from normal flight operations. A regulatory condition is specified in a regulation. A non-emergency, abnormal condition results from a non-emergency loss of function by aircraft equipment. As an example, the pre-defined, non-emergency conditions may include an enter holding pattern condition, an exit holding pattern condition, an activating a go-around maneuver for a missed approach condition, a checking into a new frequency condition, or others.

The example process 200 includes monitoring aircraft data to determine when a pre-defined condition has occurred (operation 204). Monitoring aircraft data may include retrieving aircraft data from a standard or non-standard aircraft interface such as an ARINC 429 interface, an ARINC 661 interface, a wireless data transfer system interface, a proprietary aircraft data transfer system interface or some other standard or non-standard aircraft data transfer system interface. Retrieving aircraft data may include retrieving aircraft data from flight deck equipment such as an FMS or from an aircraft data bus, such as a MIL STD 1553 bus or ASCB bus (avionics standard communications bus). Aircraft data may include flight plan data, fuel and weights data, ECF log data, aircraft state data, aircraft sensors data, and others.

The example process 200 includes determining if a pre-defined condition occurred (decision 206). If a pre-defined condition has not occurred (no at decision 206), the example process 200 includes continuing to monitor flight status to determine when a pre-determined condition has occurred (operation 204). If a pre-defined condition has occurred (yes at decision 206), the example process 200 includes automatically generating a message using a standardized format for potential use by the flight crew in communicating with the ECF (operation 208). Automatically generating a message may include automatically generating a voice message and a textual message. The message may include condition specific information, the name of the ECF, and the aircraft call sign.

The example process 200 also includes displaying the generated message and sending selection options to the flight crew via a cockpit display system, such as a touchscreen controller or a multi-function display device (operation 210). The selection options may include the option to transmit no message, the option to transmit either a computer-generated voice message or a computer-generated textual message, or the option to transmit both a computer-generated voice message and a computer-generated textual message. The selection options may also include the option to edit or append information to the message. The flight crew, after viewing the message, may choose a selection option, for example, using a multifunction display device or touchscreen controller.

A determination is made regarding whether the flight crew has selected to send the message (decision 212). If a decision is made to not send the message, (no at decision 212), the message is discarded (operation 214). If a decision is made to send the message, (yes at decision 212), a determination is made regarding the type of message (e.g., voice, text, or both) the flight crew chose to send (operation 216). The chosen message type is sent to the ECF (operation 218). Feedback may be provided to the flight crew on the sent message (operation 220).

Figure 3:
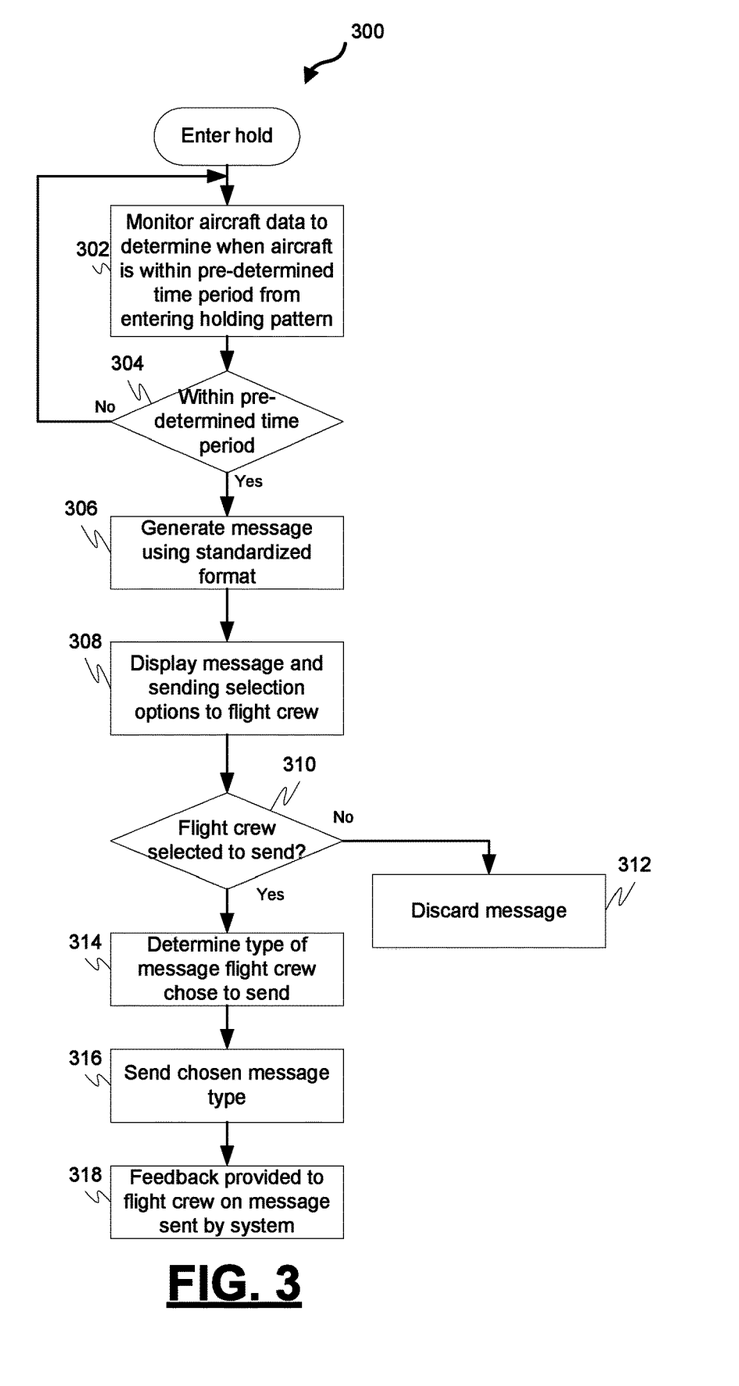
FIG. 3 is a process flow chart depicting an example process in aircraft equipment for automatically generating a radio call message for a flight crew to ATC when an aircraft enters a holding pattern, in accordance with some embodiments.

FIGS. 3-6 are process flow charts depicting other example processes in aircraft equipment for automatically generating radio call messages for a flight crew to the ECF for specific, non-emergency conditions. Specifically, FIG. 3 is a process flow chart depicting an example process 300 in aircraft equipment for automatically generating a radio call message for a flight crew to the ECF when an aircraft enters a holding pattern. The order of operation within the process is not limited to the sequential execution as illustrated in the figure, but may be performed in one or more varying orders as applicable and in accordance with the present disclosure. In various embodiments, the process can be scheduled to run based on one or more predetermined events, and/or can run continuously during operation of the aircraft.

Example process 300 may be instituted, for example, if a pilot has identified that the aircraft will be in a holding pattern at a specified waypoint through the FMS. The example process 300 includes monitoring aircraft data to determine when the aircraft is within a pre-determined time period (e.g., 1 minute) from entering a holding pattern (operation 302). Monitoring aircraft data may include retrieving aircraft data from a standard or non-standard aircraft interface such as an ARINC 429 interface, an ARINC 661 interface, a wireless data transfer system interface, a proprietary aircraft data transfer system interface or some other standard or non-standard aircraft data transfer system interface. Retrieving aircraft data may include retrieving aircraft data from flight deck equipment such as an FMS. Monitoring aircraft data may include using analytics (e.g., including the distance to the hold, the current speed, etc.). Aircraft data may include flight plan data, fuel and weights data, ECF log data, aircraft state data, aircraft sensors data, and others.

The example process 300 includes determining if the aircraft is within the pre-determined time period (e.g., 1 minute) from entering the holding pattern (decision 304). If it is determined that the aircraft is not within the pre-determined time period from entering the holding pattern (no at decision 304), the example process 300 includes continuing to monitor aircraft data to determine when the aircraft is within the pre-determined time period (operation 302). If it is determined that the aircraft is within the pre-determined time period from entering the holding pattern (yes at decision 304), the example process 300 includes automatically generating a message using a standardized format for potential use by the flight crew in communicating with the ECF (operation 306). Automatically generating a message may include automatically generating a voice message and a textual message. The message may follow a standardized format (e.g., name, flight level, holding at location, name). Information for the message may be retrieved from the FMS. Message content including the location of the hold, radial of entry or track, and the altitude may have been provided by the ECF earlier and may been entered into the FMS during the initial communication with the ECF.

The example process 300 also includes displaying the generated message and sending selection options to the flight crew via a cockpit display system, such as a touchscreen controller or a multi-function display device (operation 308). The selection options may include the option to transmit no message, the option to transmit either a computer-generated voice message or a computer-generated textual message, or the option to transmit both a computer-generated voice message and a computer-generated textual message. The selection options may also include the option to edit or append information to the message. The flight crew, after viewing the message, may choose one of the selection options, for example, using a multifunction display device or touchscreen controller.

A determination is made regarding whether the flight crew has selected to send the message (decision 310). If a decision is made to not send the message, (no at decision 310), the message is discarded (operation 312). If a decision is made to send the message, (yes at decision 310), a determination is made regarding the type of message (e.g., voice, text, or both) the flight crew chose to send (operation 314). The chosen message type is sent to the ECF (operation 316) when the aircraft enters the holding pattern. Feedback may be provided to the flight crew on the sent message (operation 318).

Figure 4:
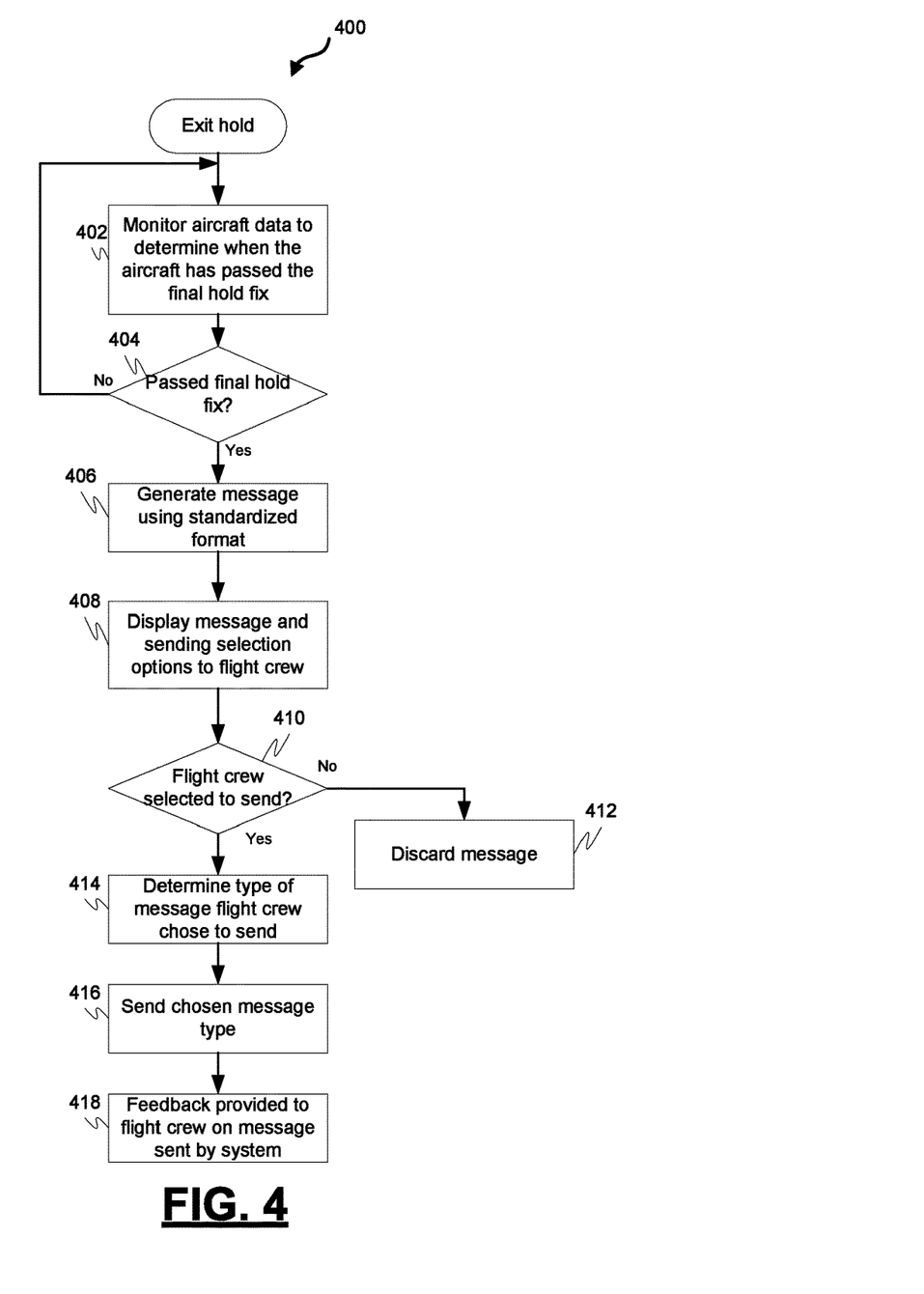
FIG. 4 is a process flow chart depicting an example process in aircraft equipment for automatically generating a radio call message for a flight crew to ATC when an aircraft exits a holding pattern, in accordance with some embodiments.

FIG. 4 is a process flow chart depicting an example process 400 in aircraft equipment for automatically generating a radio call message for a flight crew to the ECF when an aircraft exits a holding pattern. The order of operation within the process is not limited to the sequential execution as illustrated in the figure, but may be performed in one or more varying orders as applicable and in accordance with the present disclosure. In various embodiments, the process can be scheduled to run based on one or more predetermined events, and/or can run continuously during operation of the aircraft.

Example process 400 may be instituted, for example, if an aircraft has entered a holding pattern and the flight crew has opted to exit the holding pattern. The example process 400 includes monitoring aircraft data to determine when the aircraft has passed the final hold fix (operation 402). Monitoring aircraft data may include retrieving aircraft data from a standard or non-standard aircraft interface such as an ARINC 429 interface, an ARINC 661 interface, a wireless data transfer system interface, a proprietary aircraft data transfer system interface or some other standard or non-standard aircraft data transfer system interface. Retrieving aircraft data may include retrieving aircraft data from flight deck equipment such as an FMS (for instance, if the FMS has received a command from the pilot to exit the hold). Aircraft data may include flight plan data, fuel and weights data, ECF log data, aircraft state data, aircraft sensors data, and others.

The example process 400 includes determining if the aircraft has passed the final hold fix (decision 404). If it is determined that the aircraft has not passed the final hold fix (no at decision 404), the example process 400 includes continuing to monitor aircraft data to determine when the aircraft has passed the final hold fix (operation 402). If it is determined that the aircraft has passed the final hold fix (yes at decision 404), the example process 400 includes automatically generating a message using a standardized format for potential use by the flight crew in communicating with the ECF (operation 406). Automatically generating a message may include automatically generating a voice message and a textual message. The message may include condition specific information, the name of the ECF, and the aircraft call sign.

The example process 400 also includes displaying the generated message and sending selection options to the flight crew via a cockpit display system, such as a touchscreen controller or a multi-function display device (operation 408). The selection options may include the option to transmit no message, the option to transmit either a computer-generated voice message or a computer-generated textual message, or the option to transmit both a computer-generated voice message and a computer-generated textual message. The selection options may also include the option to edit or append information to the message. The flight crew, after viewing the message, may choose one of the selection options, for example, using a multifunction display device or touchscreen controller.

A determination is made regarding whether the flight crew has selected to send the message (decision 410). If a decision is made to not send the message, (no at decision 410), the message is discarded (operation 412). If a decision is made to send the message, (yes at decision 410), a determination is made regarding the type of message (e.g., voice, text, or both) the flight crew chose to send (operation 414). The chosen message type is sent to the ECF (operation 416) when the aircraft passes the final hold fix. Feedback may be provided to the flight crew on the sent message (operation 418).

Figure 5:
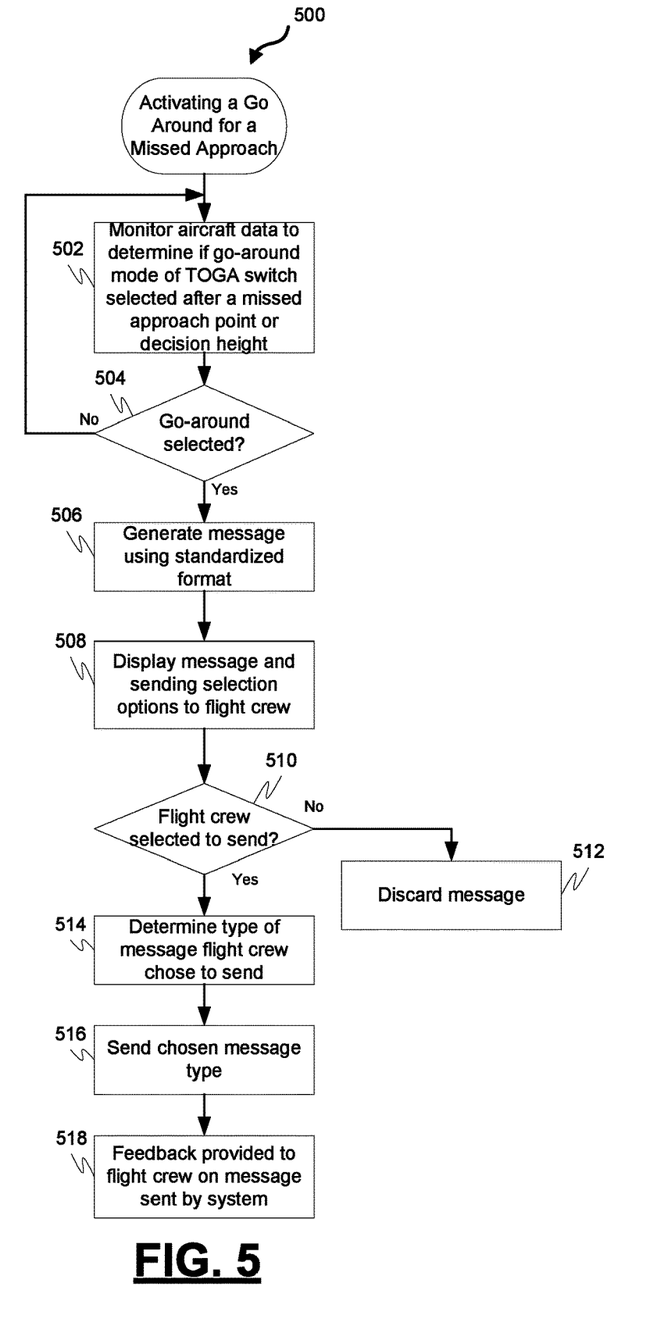
FIG. 5 is a process flow chart depicting an example process in aircraft equipment for automatically generating a radio call message for a flight crew to ATC when a go-around maneuver is activated after a missed approach, in accordance with some embodiments.

FIG. 5 is a process flow chart depicting an example process 500 in aircraft equipment for automatically generating a radio call message for a flight crew to the ECF when a go-around maneuver is activated after a missed approach. The order of operation within the process is not limited to the sequential execution as illustrated in the figure, but may be performed in one or more varying orders as applicable and in accordance with the present disclosure. In various embodiments, the process can be scheduled to run based on one or more predetermined events, and/or can run continuously during operation of the aircraft.

Example process 500 may be instituted, for example, if an aircraft is on approach and the go-around mode of the takeoff/go-around (TO/GA) switch has been selected after a missed approach point or decision height. The example process 500 includes monitoring aircraft data to determine if the go-around mode of the TO/GA switch has been selected after a missed approach point or decision height (operation 502). Monitoring aircraft data may include retrieving aircraft data from a standard or non-standard aircraft interface such as an ARINC 429 interface, an ARINC 661 interface, a wireless data transfer system interface, a proprietary aircraft data transfer system interface or some other standard or non-standard aircraft data transfer system interface. Retrieving aircraft data may include retrieving aircraft data from flight deck equipment such as an FMS.

The example process 500 includes determining if the go-around mode of the TO/GA switch has been selected after a missed approach point or decision height (decision 504). If it is determined that the go-around mode of the TO/GA switch has not been selected (no at decision 504), the example process 500 includes continuing to monitor aircraft data to determine when the go-around mode of the TO/GA switch has been selected (operation 502). If it is determined that the go-around mode of the TO/GA switch has been selected (yes at decision 504), the example process 500 includes automatically generating a message using a standardized format for potential use by the flight crew in communicating with the ECF (operation 506). The system may also use aircraft position, altitude, and energy to detect the go-around condition. Automatically generating a message may include automatically generating a voice message and a textual message. The message may follow a standardized format (e.g., "[Location] Tower, [Call Sign] missed approach"). The message may also include state details from armed systems, such as LNAV/VNAV (lateral navigation/vertical navigation), to allow for specification of "flying the published missed," or "heading 360, climbing five thousand." In the second case, the system recognizes a heading mode and an altitude preselector position. The system allows for either a simple or more verbose report, and may present these as two message alternatives at the same time for pilot selection. Moreover, the system may update the message in accordance with a pilot action, such as arming LNAV after the crew recognizes an errant HDG (heading) mode selection. The system may also update the message or flag inconsistencies prior to transmission, in accordance with any known clearances (e.g., from an ECF transcription system, or from CPDLC or clearances received on ACARS (aircraft communications addressing and reporting system).

The example process 500 also includes displaying the generated message and sending selection options to the flight crew via a cockpit display system, such as a touchscreen controller or a multi-function display device (operation 508). The selection options may include the option to transmit no message, the option to transmit either a computer-generated voice message or a computer-generated textual message, or the option to transmit both a computer-generated voice message and a computer-generated textual message. The selection options may also include the option to edit or append information to the message. The flight crew, after viewing the message, may choose one of the selection options, for example, using a multifunction display device or touchscreen controller.

A determination is made regarding whether the flight crew has selected to send the message (decision 510). If a decision is made to not send the message, (no at decision 510), the message is discarded (operation 512). If a decision is made to send the message, (yes at decision 510), a determination is made regarding the type of message (e.g., voice, text, or both) the flight crew chose to send (operation 514). The chosen message type is sent to the ECF (operation 516). Feedback is provided to the flight crew on the sent message (operation 518).

Figure 6:
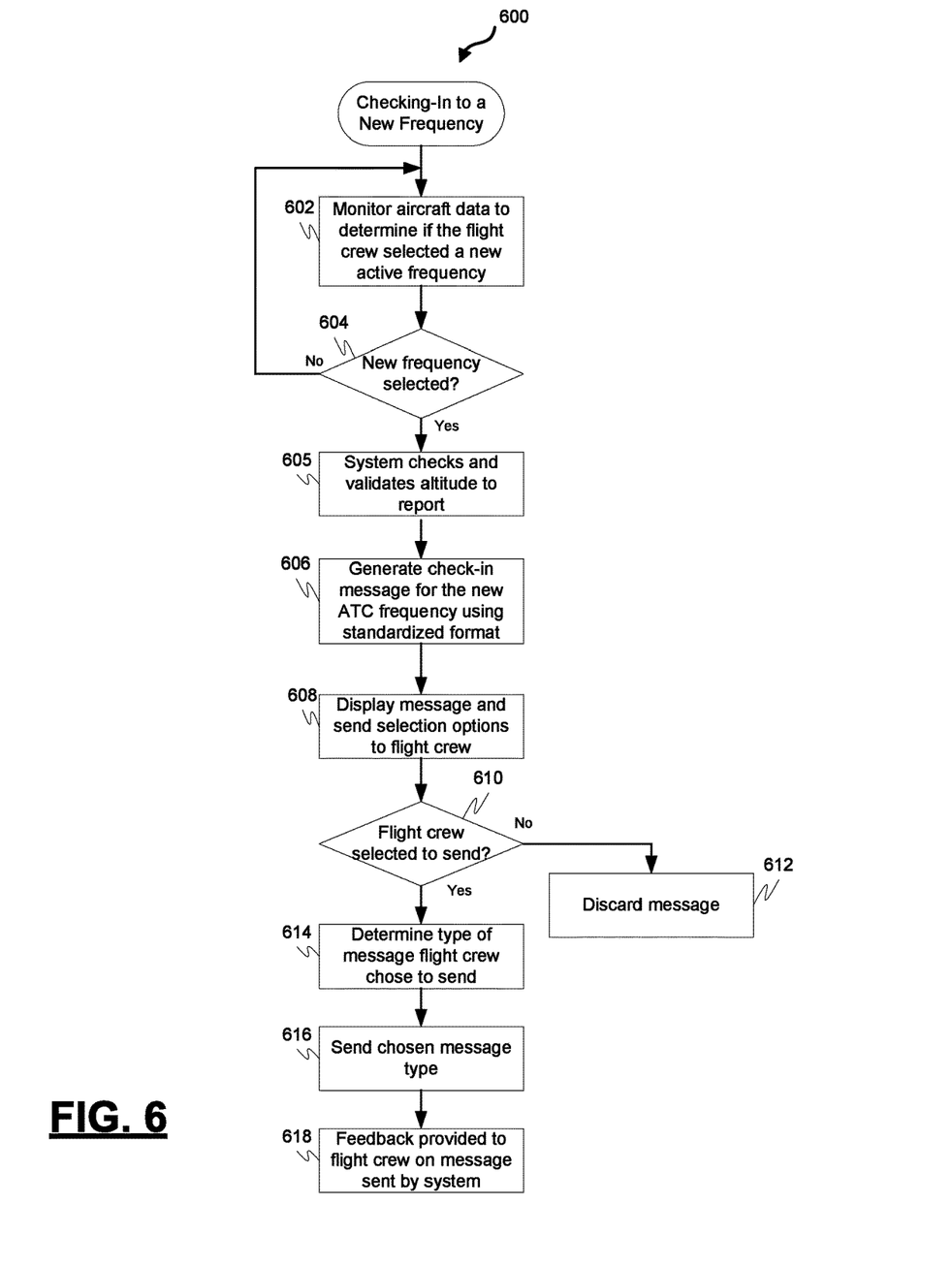
FIG. 6 is a process flow chart depicting an example process in aircraft equipment for automatically generating a radio call message for a flight crew to ATC when an aircraft checks in to a new frequency, in accordance with some embodiments.

FIG. 6 is a process flow chart depicting an example process 600 in aircraft equipment for automatically generating a radio call message for a flight crew to the ECF when an aircraft checks in to a new frequency. The order of operation within the process is not limited to the sequential execution as illustrated in the figure, but may be performed in one or more varying orders as applicable and in accordance with the present disclosure. In various embodiments, the process can be scheduled to run based on one or more predetermined events, and/or can run continuously during operation of the aircraft.

Example process 600 may be instituted, for example, if the pilot selects a new active frequency. The example process 600 includes monitoring aircraft data to determine when the flight crew has selected a new frequency (operation 602). Monitoring aircraft data may include retrieving aircraft data from a standard or non-standard aircraft interface such as an ARINC 429 interface, an ARINC 661 interface, a wireless data transfer system interface, a proprietary aircraft data transfer system interface or some other standard or non-standard aircraft data transfer system interface. Retrieving aircraft data may include retrieving aircraft data from flight deck equipment such as an FMS. Aircraft data may include flight plan data, fuel and weights data, ECF log data, aircraft state data, aircraft sensors data, and others.

The example process 600 includes determining when the flight crew has selected a new frequency (decision 604). If it is determined that the flight crew has not selected a new frequency (no at decision 604), the example process 600 includes continuing to monitor aircraft data to determine when the flight crew has selected a new frequency (operation 602). If it is determined that the flight crew has selected a new frequency (yes at decision 604), the example process 600 includes checking and validating an altitude to report with the message (operation 605) and automatically generating a message that includes the altitude using a standardized format for potential use by the flight crew in communicating with the ECF (operation 606). Automatically generating a message may include automatically generating a voice message and a textual message. The message may include condition specific information, the name of the ECF, and the aircraft call sign.

The example process 600 also includes displaying the generated message and sending selection options to the flight crew via a cockpit display system, such as a touchscreen controller or a multi-function display device (operation 608). The selection options may include the option to transmit no message, the option to transmit either a computer-generated voice message or a computer-generated textual message, or the option to transmit both a computer-generated voice message and a computer-generated textual message. The selection options may also include the option to edit or append information to the message. The flight crew, after viewing the message, may choose one of the selection options, for example, using a multifunction display device or touchscreen controller.

A determination is made regarding whether the flight crew has selected to send the message (decision 610). If a decision is made to not send the message, (no at decision 610), the message is discarded (operation 612). If a decision is made to send the message, (yes at decision 610), a determination is made regarding the type of message (e.g., voice, text, or both) the flight crew chose to send (operation 614). The chosen message type is sent to the ECF (operation 616). Feedback may be provided to the flight crew on the sent message (operation 618).

Figure 7:
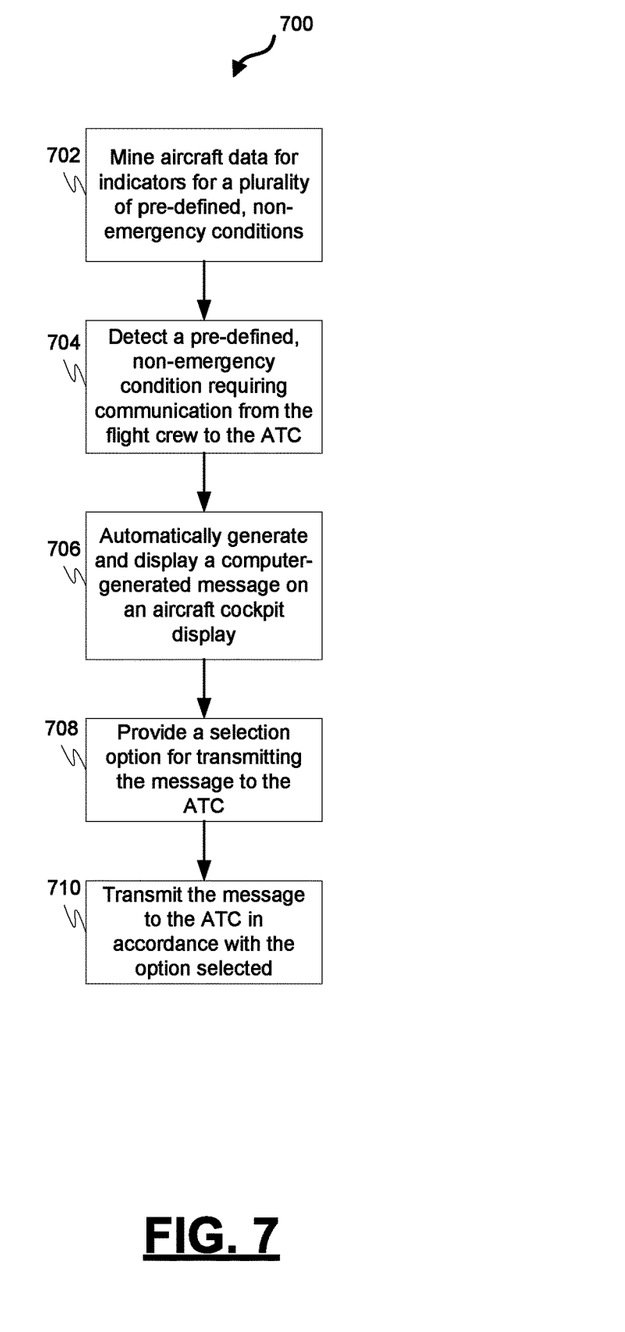
FIG. 7 is a process flow chart depicting another example process in aircraft equipment for automatically generating radio call messages for a flight crew to ATC for non-emergency conditions, in accordance with some embodiments.

FIG. 7 is a process flow chart depicting another example process 700 in aircraft equipment for automatically generating radio call messages for a flight crew to the ECF for non-emergency conditions. The order of operation within the process is not limited to the sequential execution as illustrated in the figure, but may be performed in one or more varying orders as applicable and in accordance with the present disclosure. In various embodiments, the process can be scheduled to run based on one or more predetermined events, and/or can run continuously during operation of the aircraft.

The example process 700 includes mining aircraft data by an aircraft computing system for indicators for a plurality of pre-defined, non-emergency conditions (operation 702). Mining aircraft data may include retrieving aircraft data from a standard or non-standard aircraft interface such as an ARINC 429 interface, an ARINC 661 interface, a wireless data transfer system interface, a proprietary aircraft data transfer system interface or some other standard or non-standard aircraft data transfer system interface. Retrieving aircraft data may include retrieving aircraft data from flight deck equipment such as an FMS.

The pre-defined, non-emergency conditions include a plurality of routine conditions requiring communication from a flight crew to the ECF, a plurality of regulatory conditions requiring communication from the flight crew to the ECF, and a plurality of pre-defined, non-emergency, abnormal conditions requiring communication from the flight crew to the ECF. A routine condition may result from normal flight operations. A regulatory condition is specified in a regulation. A non-emergency, abnormal condition results from a non-emergency loss of function by aircraft equipment. As an example, the pre-defined, non-emergency conditions may include an enter holding pattern condition, an exit holding pattern condition, an activating a go-around maneuver for a missed approach condition, a checking into a new frequency condition, or others.

The example process 700 further includes detecting from the mined aircraft data a pre-defined, non-emergency condition requiring communication from the flight crew to the ECF (operation 704) and automatically generating and displaying a computer-generated message on an aircraft cockpit display (operation 706). Automatically generating a message may include automatically generating a voice message and a textual message. The message may include condition specific information, the name of the ECF, and the aircraft call sign.

The example process 700 further includes provide a selection option for transmitting the message to the ECF (operation 708). The selection options may include the option to transmit no message, the option to transmit either a computer-generated voice message or a computer-generated textual message, or the option to transmit both a computer-generated voice message and a computer-generated textual message. The selection options may also include the option to edit or append information to the message. The flight crew, after viewing the message, may choose one of the selection options, for example, using a multifunction display device or touchscreen controller. The example process 700 further includes transmitting the message to the ECF in accordance with the option selected (operation 710).

Described herein are techniques for assisting a flight crew in sending a reporting message to the ECF upon the occurrence of certain events. The reporting message may be automatically generated to reduce flight crew workload and may include a voice message and/or a text message.

In one embodiment, a method in an aircraft computing system for facilitating communication between a flight crew and an external communication facility (ECF) such as air traffic control (ATC) or airline operational control (AOC) is provided. The method comprises mining aircraft data by an aircraft computing system for indicators for a plurality of pre-defined, non-emergency conditions, detecting from the mined aircraft data, by the aircraft computing system, a pre-defined, non-emergency condition requiring communication from the flight crew to the ECF, automatically generating and displaying a computer-generated message on an aircraft cockpit display responsive to detecting the condition, providing a selection option for transmitting the message to the ECF, and transmitting the message to the ECF in accordance with the option selected.

These aspects and other embodiments may include one or more of the following features. Mining aircraft data may comprise retrieving aircraft data from a standard aircraft interface. The standard aircraft interface comprises an ARINC 429 or ARINC 661 interface. Retrieving aircraft data may comprise retrieving aircraft data from a flight management system. The aircraft data may comprise one or more of flight plan data, fuel and weights data, ECF log data, aircraft state data, and aircraft sensors data. The plurality of pre-defined, non-emergency conditions may comprise a plurality of routine conditions requiring communication from a flight crew to the ECF, a plurality of regulatory conditions requiring communication from the flight crew to the ECF, and a plurality of pre-defined, non-emergency, abnormal conditions requiring communication from the flight crew to the ECF, wherein a routine condition results from normal flight operations, a regulatory condition is specified in a regulation, and a non-emergency, abnormal condition results from a non-emergency loss of function by aircraft equipment. Detecting a condition may comprise determining a condition for which to monitor based on the aircraft data. Automatically generating a computer-generated message may comprise automatically generating a computer-generated voice message and a computer-generated textual message. The computer-generated message may include condition specific information, the name of the ECF, and the aircraft call sign. Providing a selection option may comprise providing the option to transmit no message, either a computer-generated voice message or a computer-generated textual message, or both a computer-generated voice message and a computer-generated textual message. Providing a selection option may comprise providing the option to revise the message. The method may further comprise detecting an emergency message and automatically transmitting the emergency message to the ECF. The pre-defined, non-emergency conditions may comprise one or more of an enter holding pattern condition, exit holding pattern condition, activating a go-around maneuver for a missed approach condition, and a checking in to a new frequency condition.

In another embodiment, an automatic message generation system for an aircraft is provided. The system comprises a data mining engine comprising one or more processors configured by programming instructions encoded on non-transient computer readable media wherein the data mining engine is configured to mine aircraft data for indicators for a plurality of pre-defined, non-emergency conditions, a condition detection engine comprising one or more processors configured by programming instructions encoded on non-transient computer readable media wherein the condition detection engine is configured to detect from the mined aircraft data a pre-defined, non-emergency condition requiring communication from the flight crew to the external communication facility (ECF) such as air traffic control (ATC) or airline operational control (AOC), and a message generation engine comprising one or more processors configured by programming instructions encoded on non-transient computer readable media. The message generation engine is configured to automatically generate and display a computer-generated message on an aircraft cockpit display responsive to detecting the condition, provide a selection option for transmitting the message to the ECF and receive a selected option. The system further comprises a message transmitter comprising one or more processors configured by programming instructions encoded on non-transient computer readable media wherein the message transmitter is configured to transmit the message to the ECF in accordance with the option selected.

These aspects and other embodiments may include one or more of the following features. The computer-generated message may comprise a computer-generated voice message and a computer-generated textual message. The selection option may comprise an option to transmit no message, an option to transmit either a computer-generated voice message or a computer-generated textual message, or an option to transmit both a computer-generated voice message and a computer-generated textual message. The aircraft data may comprise one or more of flight plan data, fuel and weights data, ECF log data, aircraft state data, and aircraft sensors data. The plurality of pre-defined, non-emergency conditions may comprise a plurality of routine conditions requiring communication from a flight crew to the ECF, a plurality of regulatory conditions requiring communication from the flight crew to the ECF, and a plurality of pre-defined, non-emergency, abnormal conditions requiring communication from the flight crew to the ECF, wherein a routine condition results from normal flight operations, a regulatory condition is specified in a regulation, and a non-emergency, abnormal condition results from a non-emergency loss of function by aircraft equipment. The condition detection engine may be further configured to determine a condition for which to monitor based on the mined aircraft data.

In another embodiment, an automatic message generation system for an aircraft is provided. The system comprises one or more processors configured by programming instructions encoded on non-transient computer readable media. The system is configured to monitor aircraft data for indicators for a plurality of pre-defined, non-emergency conditions, detect a pre-defined, non-emergency condition requiring communication from the flight crew to the external communication facility (ECF) such as air traffic control (ATC) or airline operational control (AOC), automatically generate and display a computer-generated message on an aircraft cockpit display responsive to detecting the condition, provide a selection option for transmitting the message to the ECF, receive a selected option, and transmit the message to the ECF in accordance with the selected option.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method in an aircraft computing system for facilitating communication between a flight crew and an external communication facility (ECF), the method comprising:
   mining aircraft data by an aircraft computing system for indicators for a plurality of pre-defined, non-emergency conditions from an aircraft interface to flight desk equipment;
   detecting from the mined aircraft data, by the aircraft computing system, a predefined, non-emergency condition requiring communication from the flight crew to the ECF;
   automatically generating and displaying a computer-generated message on an aircraft cockpit display responsive to detecting the condition;
   providing a selection option for transmitting the message to the ECF; and
   transmitting the message to the ECF in accordance with the option selected.

2. The method of claim 1, wherein mining aircraft data comprises retrieving aircraft data from a standard aircraft interface.

3. The method of claim 2, wherein the standard aircraft interface comprises an ARINC 429 interface or an ARINC 661 interface.

4. The method of claim 2, wherein retrieving aircraft data comprises retrieving aircraft data from a flight management system.

5. The method of claim 1, wherein the aircraft data comprises one or more of flight plan data, fuel and weights data, ECF log data, aircraft state data, and aircraft sensors data.

6. The method of claim 1, wherein the plurality of pre-defined, non-emergency conditions comprise a plurality of routine conditions requiring communication from a flight crew to the ECF, a plurality of regulatory conditions requiring communication from the flight crew to the ECF, and a plurality of pre-defined, non-emergency, abnormal conditions requiring communication from the flight crew to the ECF, wherein a routine condition results from normal flight operations, a regulatory condition is specified in a regulation, and a non-emergency, abnormal condition results from a non-emergency loss of function by aircraft equipment.

7. The method of claim 1, wherein detecting a condition comprises determining a condition for which to monitor based on the aircraft data.

8. The method of claim 1, wherein automatically generating a computer-generated message comprises automatically generating a computer-generated voice message and a computer-generated textual message.

9. The method of claim 1, wherein the computer-generated message includes condition specific information, the name of the ECF, and the aircraft call sign.

10. The method of claim 1, wherein providing a selection option comprises providing the option to transmit no message, either a computer-generated voice message or a computer-generated textual message, or both a computer-generated voice message and a computer-generated textual message.

11. The method of claim 1, wherein providing a selection option comprises providing the option to revise the message.

12. The method of claim 1, further comprising detecting an emergency message and automatically transmitting the emergency message to the ECF.

13. The method of claim 1, wherein the pre-defined, non-emergency conditions comprises one or more of an enter holding pattern condition, exit holding pattern condition, activating a go-around maneuver for a missed approach condition, and a checking in to a new frequency condition.

14. An automatic message generation system for an aircraft for facilitating communication between a flight crew and an external communication facility (ECF), the system comprising:
   a data mining engine comprising one or more processors configured by programming instructions encoded on non-transient computer readable media, the data mining engine configured to mine aircraft data for indicators for a plurality of pre-defined, non-emergency conditions from an aircraft interface to flight desk equipment;
   a condition detection engine comprising one or more processors configured by programming instructions encoded on non-transient computer readable media, the condition detection engine configured to detect from the mined aircraft data a pre-defined, nonemergency condition requiring communication from the flight crew to the external communication facility (ECF);
   a message generation engine comprising one or more processors configured by programming instructions encoded on non-transient computer readable media, the message generation engine configured to:
- automatically generate and display a computer-generated message on an aircraft cockpit display responsive to detecting the condition;
- provide a selection option for transmitting the message to the ECF; and
- receive a selected option; and a message transmitter comprising one or more processors configured by programming instructions encoded on non-transient computer readable media, the message transmitter configured to transmit the message to the ECF in accordance with the option selected.

15. The system of claim 14, wherein the computer-generated message comprises a computer-generated voice message and a computer-generated textual message.

16. The system of claim 14, wherein the selection option comprises an option to transmit no message, an option to transmit either a computer-generated voice message or a computer-generated textual message, or an option to transmit both a computer-generated voice message and a computer-generated textual message.

17. The system of claim 14, wherein the aircraft data comprises one or more of flight plan data, fuel and weights data, ECF log data, aircraft state data, and aircraft sensors data.

18. The system of claim 14, wherein the plurality of pre-defined, non-emergency conditions comprise a plurality of routine conditions requiring communication from the flight crew to the ECF, a plurality of regulatory conditions requiring communication from the flight crew to the ECF, and a plurality of pre-defined, non-emergency, abnormal conditions requiring communication from the flight crew to the ECF, wherein a routine condition results from normal flight operations, a regulatory condition is specified in a regulation, and a non-emergency, abnormal condition results from a non-emergency loss of function by aircraft equipment.

19. The system of claim 14, wherein the condition detection engine is further configured to determine a condition for which to monitor based on the mined aircraft data.

20. An automatic message generation system for an aircraft for facilitating communication between a flight crew and an external communication facility (ECF), the system comprising one or more processors configured by programming instructions encoded on non-transient computer readable media, the system configure to:
- monitor aircraft data for indicators for a plurality of pre-defined, non-emergency conditions from an aircraft interface to flight desk equipment;
- detect a pre-defined, non-emergency condition requiring communication from the flight crew to the external communication facility (ECF);
- automatically generate and display a computer-generated message on an aircraft cockpit display responsive to detecting the condition;
- provide a selection option for transmitting the message to the ECF;
- receive a selected option; and
- transmit the message to the ECF in accordance with the selected option.

* * * * *